United States Patent [19]
Khayrallah

[11] Patent Number: 6,145,110
[45] Date of Patent: Nov. 7, 2000

[54] DIGITAL DATA DECODER THAT DERIVES CODEWORD ESTIMATES FROM SOFT DATA

[75] Inventor: Ali S. Khayrallah, Apex, N.C.

[73] Assignee: Ericsson Inc., Research Triangle Park, N.C.

[21] Appl. No.: 09/102,291

[22] Filed: Jun. 22, 1998

[51] Int. Cl.[7] .................................................. H03M 13/00
[52] U.S. Cl. .......................... 714/752; 714/751; 714/755; 714/780
[58] Field of Search .................................. 714/751, 752, 714/755, 780, 782, 785, 761

[56] References Cited

U.S. PATENT DOCUMENTS

| | | | |
|---|---|---|---|
| 3,609,682 | 9/1971 | Mitchell | 714/760 |
| 5,285,454 | 2/1994 | Blaum et al. | 714/752 |
| 5,608,739 | 3/1997 | Snodgrass et al. | 714/785 |
| 5,968,198 | 10/1999 | Hassan et al. | 714/752 |
| 5,968,199 | 10/1999 | Khayrallah | 714/783 |

FOREIGN PATENT DOCUMENTS

| | | |
|---|---|---|
| 0397385 | 11/1990 | European Pat. Off. . |
| 97/34389 | 9/1997 | WIPO . |

*Primary Examiner*—Emmanuel L. Moise
*Attorney, Agent, or Firm*—Wood, Phillips, VanSanten, Clark & Mortimer

[57] ABSTRACT

A forward error correction decoder receives a received word comprising a plurality of characters. The decoder also receives a reliability value for each character. The decoder calculates a syndrome for each member of the set of possible received words by transforming each member with the parity check matrix. Members of the set having the same syndrome are grouped together into cosets. A weight based on the reliability value is then assigned to each member in each coset. The weight is defined to be the number of low reliability, non-zero characters in each member of the set of possible received words. For each coset, the member that has the lowest weight is selected as a coset leader. A syndrome is computed for the soft codeword by transforming it with the parity check matrix. The coset leader with the same syndrome as the received word is subtracted from the received word resulting in a codeword estimate.

14 Claims, 5 Drawing Sheets

DIGITAL DATA DECODER THAT DERIVES CODEWORD ESTIMATES FROM SOFT DATA

FIELD OF THE INVENTION

This invention relates to the field of forward error correction, and, more specifically, to an algebraic decoder capable of estimating codewords from soft data.

BACKGROUND OF THE INVENTION

Forward error correction is an abstract but vital field to today's communications. Much if not most of today's communications, including voice telecommunications, is transmitted as digital data. Forward error correction facilitates data communication by detecting and correcting data errors introduced during transmission. The underlying principle of all forward error correction is to add sufficient redundant data to detect and correct one or more errors over a predetermined amount of data. Forward error correction codes must therefore have sufficient redundant data to be useful, but not so much as to significantly slow the data transmission.

Before the data is transmitted, encoders add correction codes according to the selected encoding method, forming a "codeword" comprising a plurality of characters or symbols. For example, a codeword comprising eight binary characters ("symbols") has eight "1's" or "0's" to convey the information data and the correction code (redundant) data.

Each character in the resulting codeword is modulated into a signal and transmitted. A demodulator receives the transmitted signal and decides what character the signal represents. Due to problems in transmission (fading and the like), a demodulator may not be able to make a definite decision whether an unclear signal represents one character or another. The demodulator makes a guess of the character and delivers the character (a "hard" symbol) to the decoder, as is known in the art. The demodulator produces a hard symbol, which belongs to the finite set of symbols that can be produced by the encoder. In addition, the demodulator produces a reliability (or "soft") value for that symbol, indicating the confidence level.

The designs of many forward error correction decoders are based on the assumption that the data received was received clearly. Thus, many decoders operate on hard data only. Such decoders have the advantage of low complexity. By not exploiting soft data, however, they perform relatively poorly, especially in fading channels, typical of wireless communications. A decoder that exploits soft data can significantly improve the receiver's performance. The biggest potential problem is the increase in complexity.

Receiver performance is reflected in the percentage of received data blocks that are rejected by the receiver. In certain applications, where some delay is tolerable, rejected data blocks can be replaced by requesting retransmission by the transmitter. Time intensive applications must either attempt to use the soft data or attempt to work around discarded data blocks.

The most time intensive application for data transmission is digitally encoded speech. In speech applications, the quality of the received signal is directly related to the accuracy of the data received over a given time period. Dropped data blocks cause signal distortion, missing syllables and gaps in the speech. Therefore, recovering soft data is important in time sensitive data transmissions, such as digitally encoded speech.

One decoder that takes advantage of soft data is an "errors and erasures" decoder. This decoder repeatedly decodes a soft data block, where the least reliable characters are changed. The best answer among the ones obtained by the repeated decoding is selected according to appropriate criteria. The complexity of an errors and erasures technique increases with the number of iterations of decoding. The time required for the number of iterations and the complexity of the calculations necessary for an errors and erasures decoder generally precludes using this type of decoder in time-intensive data transmission, such as voice.

Therefore, there is a need in the art for a decoder that can use both hard and soft information for time intensive applications.

SUMMARY OF THE INVENTION

This problem is solved and a technical advance achieved in the art by a method for estimating a codeword from soft information. An algebraic decoder according to my method uses a forward error correction code based on a generator matrix to encode and an additional parity check matrix to decode the information data. At the receiver, the demodulator produces a received word, which contains the hard data. Specifically, the received word has the same length as the transmitted codeword, and its symbols belong to the set of symbols produced by the encoder. In addition, the demodulator produces a vector of soft data, one value for each symbol in the received word. The decoder processes the received word and the soft values to produce a codeword estimate. The soft values act as a bias, making the decoder more likely to change symbols with low reliability in finding the codeword estimate, since such symbols are the ones most likely to be in error.

The present invention distinguishes itself from an errors and erasures decoder in that it requires a single decoding pass. It is also capable of exploiting the value of the soft information more directly. The decoder operates over the field of the code, and does not use any extensive arithmetic operations over real or complex numbers. It can be implemented very efficiently in hardware, and requires very few operations when storage is available for pre-computed quantities.

A decoder according to an exemplary embodiment of this invention accepts a received word comprising a plurality of characters. The decoder first produces a syndrome for the received word using the parity check matrix. The decoder produces a plurality of cosets by determining a syndrome (using the parity check matrix) for each member of the predetermined set of received words, and grouping all members of the set having the same syndrome into a coset. The decoder chooses a member of the coset corresponding to that syndrome as the most likely error pattern. That choice is biased by the reliability values. The chosen error pattern is then subtracted from the received word to produce the codeword estimate. The information symbols corresponding to the codeword estimate are then fed to the next stage, for example, a speech decoder. The biasing in the decoder is obtained by computing a modified Hamming weight incorporating the soft data.

Extra processing is required to compute the weights for all the coset elements, then finding the coset element with the desired weight for the coset leader. Advantageously, when there is a finite set of combinations of reliability values, the coset leaders are pre-computed and stored.

BRIEF DESCRIPTION OF THE DRAWINGS

A more complete understanding of the invention may be obtained from consideration of the following description in conjunction with the drawings, in which.

DETAILED DESCRIPTION

Figure 1:
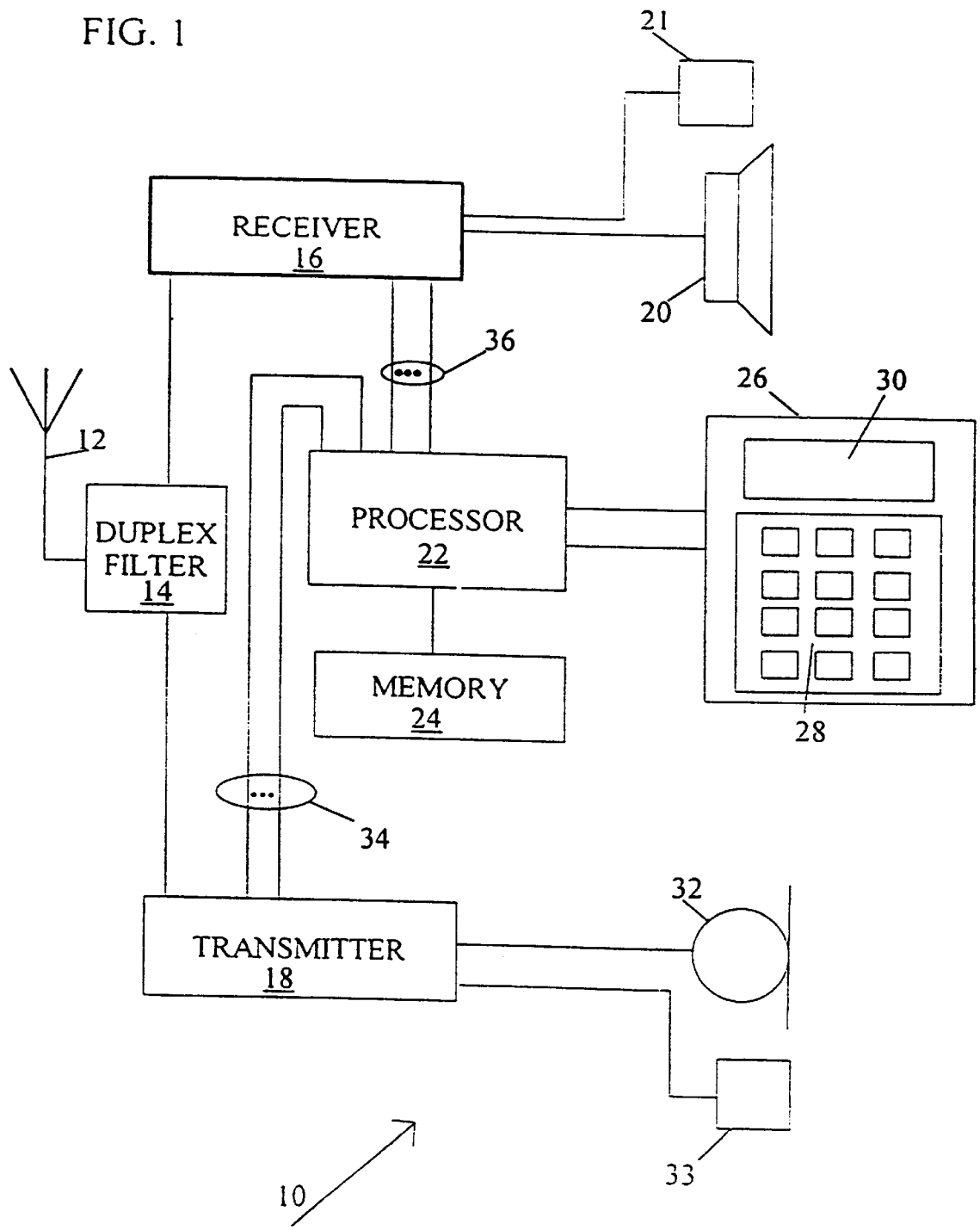
FIG. 1 is a block diagram of a mobile station in which this invention operates.

This invention is illustrated herein in the context of a mobile station operating in a wireless network. The applicability of this invention is not limited to mobile stations, however. This invention may be used in base stations, or in most any applications that use forward error correction. FIG. 1 is a block diagram of a mobile station (also called a wireless telephone, cellular telephone or cell phone), shown generally at 10, that decodes soft information according to the method of this invention. Mobile station 10 includes an antenna 12 for sending and receiving radio signals between itself and a wireless network. Antenna 12 is connected to duplex filter 14, which enables receiver 16 and transmitter 18 to receive and broadcast (respectively) on the same antenna 12. Receiver 16 demodulates, demultiplexes and decodes the radio signals into one or more channels, as will be explained in more detail in connection with FIG. 2. Such channels include a control channel and a traffic channel for speech or data. Speech is delivered to speaker 20, data is delivered to a connector 21 to a modem or fax.

Receiver 16 delivers messages from the control channel to processor 22. Processor 22 controls and coordinates the functioning of mobile station 10 responsive to messages on the control channel using programs and data stored in memory 24, so that mobile station 10 can operate within the wireless network. Processor 22 also controls the operation of mobile station 10 responsive to input from user interface 26. User interface 26 includes a keypad 28 as a user-input device and a display 30 to give the user information. Other devices are frequently included in user interface 26, such as lights and special purpose buttons. Processor 22 controls the operations of transmitter 18 and receiver 16 over control lines 34 and 36, respectively, responsive to control messages and user input.

Microphone 32 receives speech signal input, converts the input into analog electrical signals and delivers the analog electrical signals to transmitter 18. Connector 21 receives digital data input from, for example, a fax machine or a modem. Transmitter 18 converts the analog electrical signals into digital data, encodes the data with error detection and correction information and multiplexes this data with control messages from processor 22. Transmitter 18 modulates this combined data stream and broadcasts the resultant radio signals to the wireless network through duplex filter 14 and antenna 12.

Figure 2:
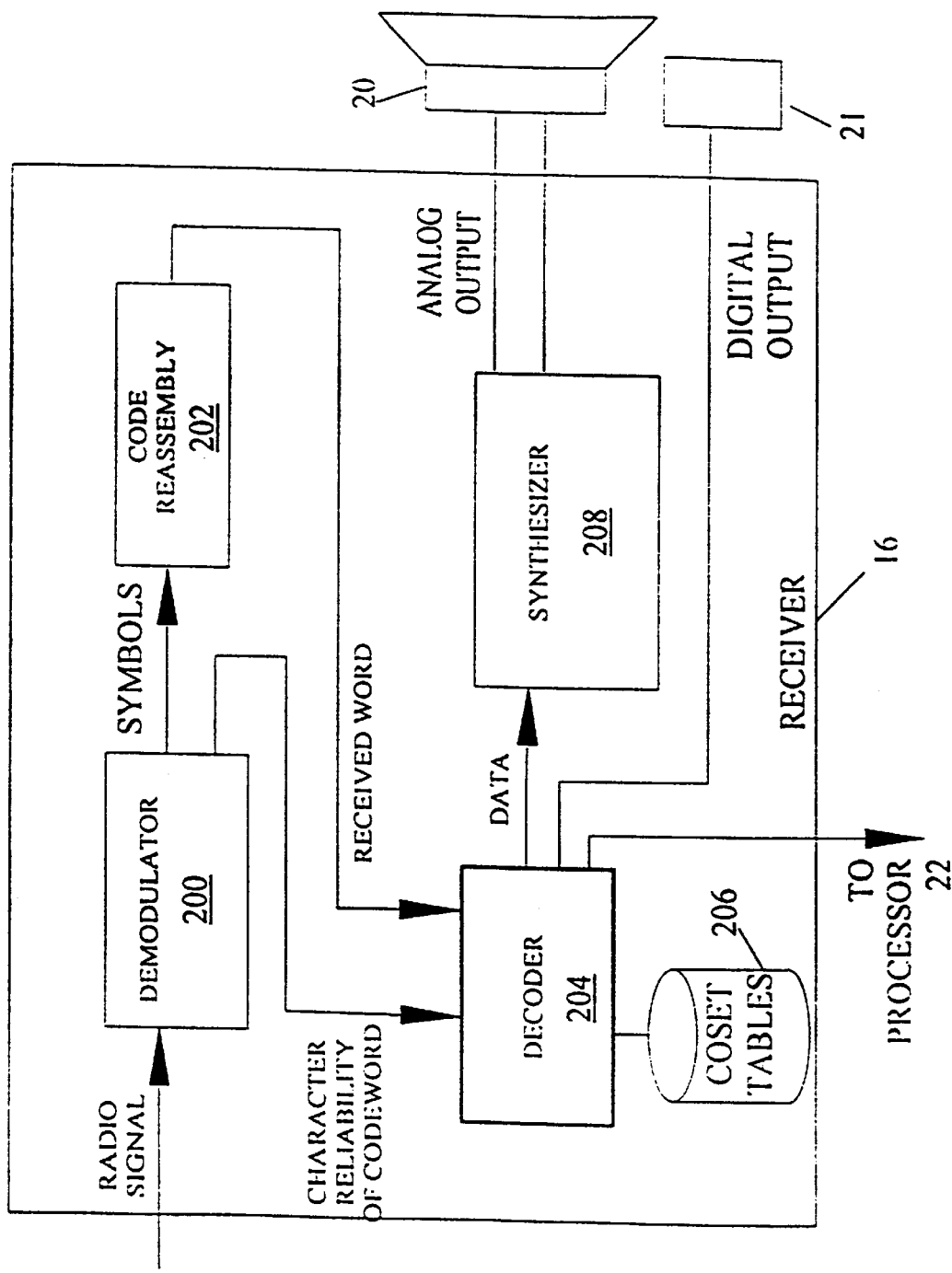
FIG. 2 is a block diagram of the receiver of FIG. 1 in which a method of this invention operates.

FIG. 2 is a more detailed block diagram of the receiver 16 of FIG. 1. Demodulator 200 receives radio signals from duplex filter 14, and demodulates the radio signals into characters. At the same time, demodulator 200 determines a confidence score, as is known in the art, indicating how confident it is that each character is accurate. The decoded character is delivered to a code reassembler 202 according to an exemplary embodiment of this invention. Code reassembler 202 is advantageous in systems that use time slots and interleave encoded data as a hedge against fading in the transmission. The Global System for Mobile communication (GSM) standard, for example, specifies such interleaving. Code reassembly 202 takes interleaved characters and reassembles them in their proper order. The output of code reassembly, a received word, is delivered to a decoder 204 according to my invention.

Decoder 204 receives a received word and a character reliability value for each character in the received word. Decoder 204 decodes the received word using precalculated syndrome-coset tables 206. According to an exemplary embodiment of this method, decoder 204 uses the character reliability value to select one of a plurality of syndrome-coset tables. Decoder 204 calculates the syndrome of the received word according to equation 2, below. The syndrome of the received word is used to select a coset leader from the selected coset leader table. The coset leader is subtracted from the codeword to derive a codeword estimate.

Once the received words have been decoded, their corresponding information symbols are delivered to their destination, as is known in the art. Received words that are determined to be control messages are delivered to processor 22 (FIG. 1). Received words that are voice traffic are delivered to synthesizer 208, which uses the data to synthesize speech. The synthesized speech is delivered on analog wires to speaker 20. If mobile station 10 is being used as a data modem, then the information symbols are delivered directly from decoder to the data output 21.

An exemplary embodiment of this decoder is described in the context of an (n,k;d) linear code over a finite field of size q, wherein n is the total number of characters, k is the number of information characters, d is the minimum Hamming distance of the code (an indicator of the error mitigation capability of the code) and q=2 is the number of values that each character can take (in a binary code, q=2). To illustrate the invention, the (7,4;3) Hamming code (n=7, k=4 and d=3) over a finite field of size q=2 is used as an example. Thus, for every four information characters in the binary field, there are three parity characters added at the encoder. The four information characters are mathematically transformed using a generator matrix. There are $q^k$ combinations of information characters and therefore $q^k$ possible codewords (comprising 7 characters each) generated by a generator matrix, designated G. Thus, there is a limited set of codewords ($q^k$ in this example) generated at the codeword generator. For the (7,4; 3) Hamming code $$G = \begin{bmatrix} 1000110 \\ 0100101 \\ 0010011 \\ 0001111 \end{bmatrix}$$

At the receiving end, there is a parity check matrix to determine whether errors were introduced into the received codeword during transmission. The corresponding parity check matrix H is a full rank matrix selected so that $$GH^T = 0 \qquad (1)$$

wherein T is the matrix transpose function. For the (7,4;3) Hamming code, H is the matrix $$H = \begin{bmatrix} 1101100 \\ 1011010 \\ 0111001 \end{bmatrix}$$

At the decoder, a received codeword z is transposed with the matrix H. The result is the syndrome s, given by $$s = zH^T \quad (2)$$

where T denotes the transpose. When s=0, the codeword has no errors (per equation 1). When s is non-zero, an error has been detected.

In order to determine which character or characters were most likely in error, a probability table is prepared. There is a predetermined set of $q^n$ possible received words z. However, there is a finite number of syndromes of the $q^n$ possible received words z. Each of the $q^n$ set of possible received word z that has the same syndrome s (according to equation 2) is grouped into a coset. There are $q^m$ possible cosets, wherein m=n−k is the number of check characters ($q^m$ is also the number of possible syndromes) and wherein each coset is of size $q^k$.

To determine which character in the received codeword is most likely in error, a Hamming weight is assigned to each received word z. In this embodiment of this method, the Hamming weight w(z) is defined as the number of non-zero characters in the received word z, wherein the Hamming weight increases with the number of non-zero characters. This weighting system is based on the fact that it is more likely that fewer characters were changed during transmission than more characters. For each syndrome s, a coset element with the smallest Hamming weight (least number of non-zero characters) is chosen as the coset leader, e. For the Hamming code (7,4;3), the syndromes and the corresponding coset leaders are given in Table 1.

TABLE 1

| Syndrome s | Coset leader e | Weight w(e) |
|---|---|---|
| 000 | 0000000 | 0 |
| 001 | 0000001 | 1 |
| 010 | 0000010 | 1 |
| 011 | 0010000 | 1 |
| 100 | 0000100 | 1 |
| 101 | 0100000 | 1 |
| 110 | 1000000 | 1 |
| 111 | 0001000 | 1 |

A decoding procedure according to my method comprises accepting a received word z, computing the syndrome s, and then subtract the corresponding coset leader e from z, to obtain the codeword estimate ŷ, such that $$\hat{y} = z - e$$

It is advantageous to compute the cosets and the coset leaders in advance, and store them in a table to improve performance of the decoder. In the absence of any additional information, ŷ is the best estimate of the transmitted codeword.

When soft information $r_i$ is available for each received character $z_i$, in received word z, it is used to bias the above-described coset leader table towards the most likely codeword estimate, ŷ. In this exemplary embodiment, the character reliability value $r_i$ is a nonnegative integer that increases with increased character reliability. A new weight w' is computed for each coset by summing the character reliability values.

$$w'(z) = \sum_{i: z_i \neq 0} r_i$$

If every instance of $r_i=1$, then w'(z)=w(z) (the weights are identical). According to this exemplary embodiment, a new coset leader e' is selected according to the new weight w'. A plurality of tables is developed for every possible combination of weights w'. In one example of a table, for the Hamming code (7,4;3), if $r_1=\ldots=r_4=2$, and $r_5=r_6=r_7=1$, then the first four characters are more reliable than the last three. Therefore, the error correcting capability of the code is focused on the unreliable section of the received word (the last three characters). The syndromes and the corresponding new coset leaders are given in Table 2. In Table 2, the rows have been rearranged by increasing value of w'. Note in particular that there are three new coset leaders. As compared to Table 1, in Table 2 the 1's in the coset leaders have shifted towards the right (towards the last three characters), where the less reliable characters are.

TABLE 2

| syndrome | coset leader | weight |
|---|---|---|
| 000 | 0000000 | 0 |
| 001 | 0000001 | 1 |
| 010 | 0000010 | 1 |
| 100 | 0000100 | 1 |
| 011 | 0000011 | 2 |
| 111 | 0000101 | 2 |
| 110 | 0000110 | 2 |
| 111 | 0001000 | 2 |

Thus, a codeword estimate of greater reliability is calculated, with a higher probability that the received word has been corrected.

Figure 3:
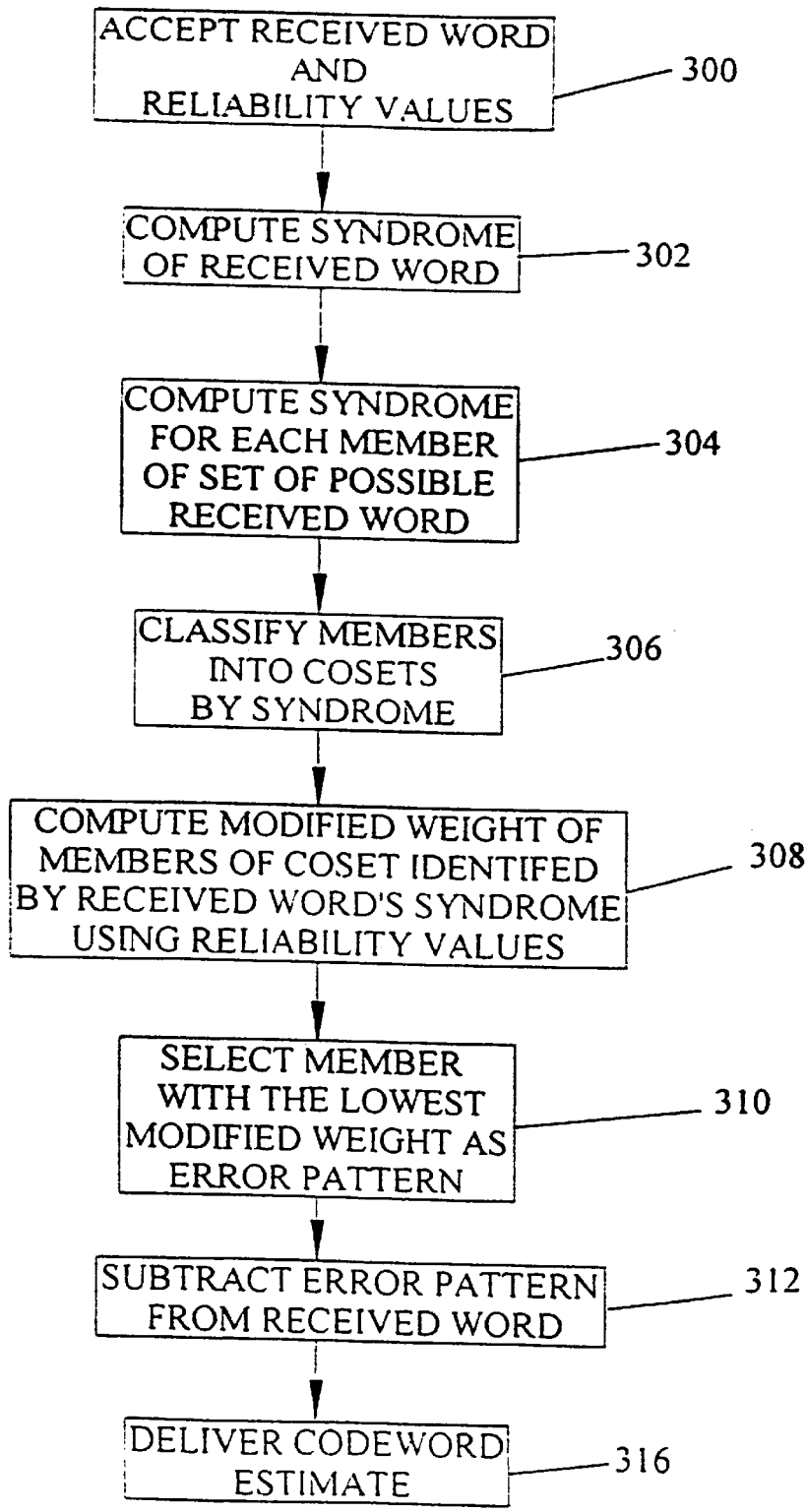
FIG. 3 is a flow chart of processing according to one exemplary embodiment of the method of this invention.

FIG. 3 is a flow chart describing processing according to an exemplary method. This flow chart describes both the computations necessary to calculate a codeword estimate, and also to generate a table that can be referenced by the character reliability values $r_i$, as may be used in the example of FIG. 2. Processing begins in box 300, when a received word and the reliability values for each character in the received word are accepted at decoder 204. Processing continues to box 302, where the syndrome of the received word is computed using the parity check matrix. In box 304, a syndrome is computed for each member of the set of possible received words. In box 306, each member of the set of possible received words is classified into a coset based on its respective syndrome. In box 308, the modified weight w' incorporating the reliability values, is computed according to equation 2 for each of the $q^k$ elements of the coset identified by the syndrome obtained in box 302. In box 310, the element e' with the smallest modified weight w'(e') is selected as the most likely error pattern. In box 312, the error pattern e' is subtracted from the received word z to obtain the codeword estimate (i=z−e'). The codeword estimate is delivered in box 316.

Figure 4:
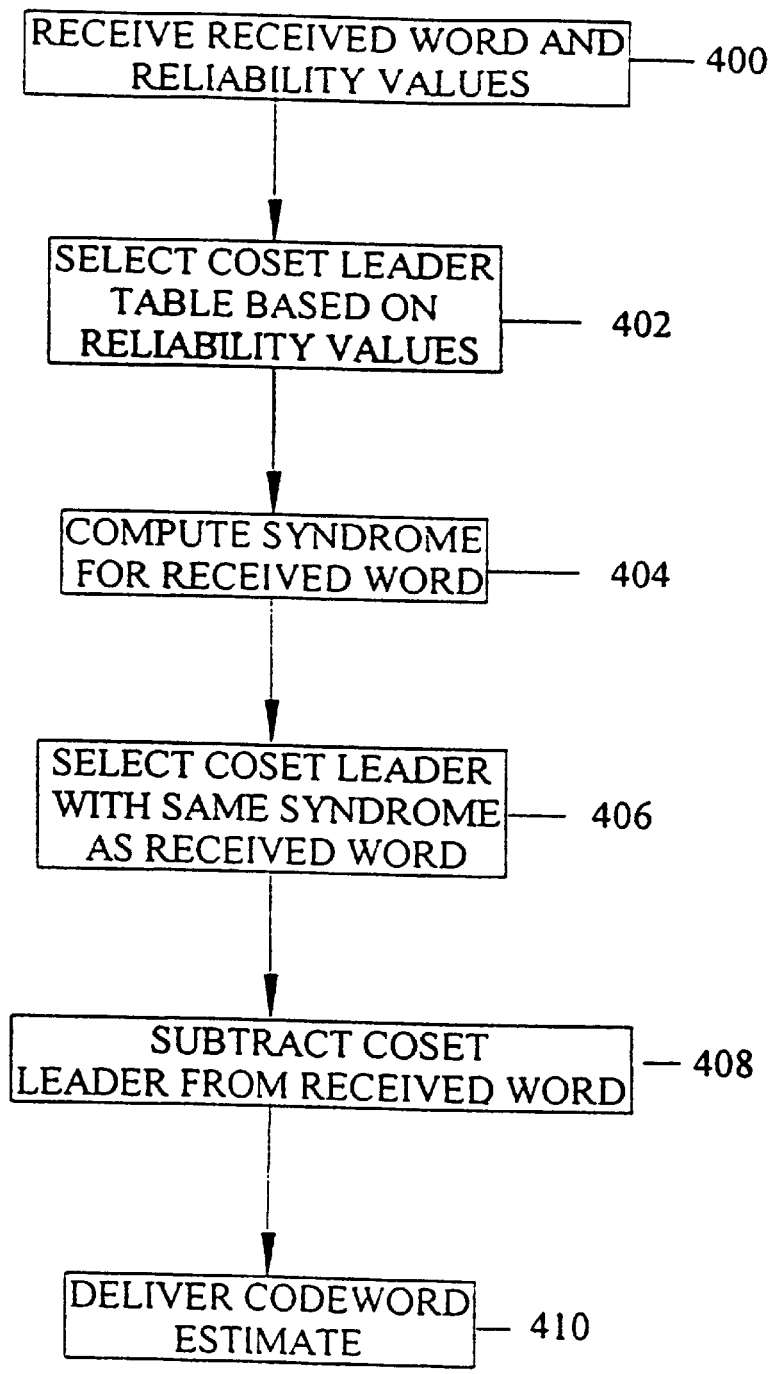
FIG. 4 is a flow chart of processing according to another exemplary embodiment of the method of this invention.

FIG. 4 is a flow chart of processing in decoder 204 when the coset leader-syndrome tables are precalculated and stored in coset tables 206. In this case, the coset leader-syndrome tables are calculated offline, according to steps 304 and 308, and the weights are calculated as described in the flowchart of FIG. 3. These tables are stored in memory (ROM, for example). Processing begins in box 400 when a received word and reliability values for each character in the received word are accepted. Processing continues to box 402, where a coset leader-syndrome table is selected based on the reliability values. In box 404, the syndrome for the received code word is calculated, and, in box 408, the coset leader with the same syndrome as the received word is subtracted from the received word. The derived codeword estimate is delivered in box 410.

Figure 5:
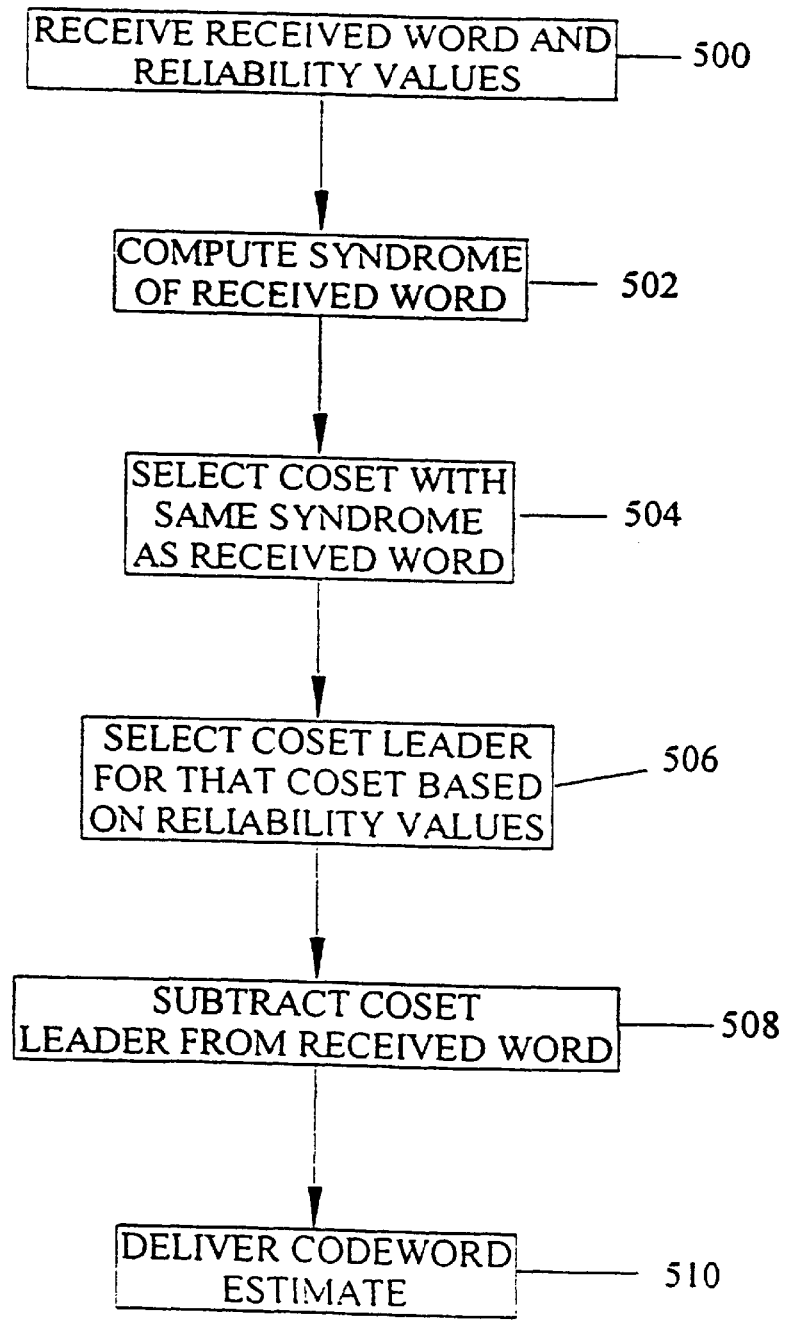
FIG. 5 is a flow chart of processing according to a further exemplary embodiment of the method of this invention.

FIG. 5 is a further flow chart of processing in decoder 204 wherein the coset leader-syndrome tables are precalculated and stored, as in FIG. 4. Processing begins in box 500 where a received word and reliability values for each character in the received word are received. In box 502, the syndrome for the received code word is calculated. Processing continues to box 504, wherein the coset with the same syndrome as the received word is selected. Continuing to box 506, the coset leader for that coset is selected based on the reliability values received with the received word. In box 508, the coset leader with the same syndrome as the received word is subtracted from the received word. The derived codeword estimate is delivered in box 510. In this manner, decoder 204 uses its processing capacity more efficiently that in FIGS. 3 and 4, by performing the fewest calculations per received word.

Bounded distance decoding is a variation on the above syndrome based decoder that uses a subset of the $q^M$ available coset leaders for decoding. For a given $L<q^M$, the subset includes L coset leaders of lowest weight. If the received word z produces a syndrome whose corresponding coset leader does not belong to the subset, then a decoding failure is declared. Different systems process failures differently. For instance, a retransmission is requested, or a block of information is erased.

In the context of this invention, a bounded distance decoder is defined so that the L coset leaders in the subset are chosen according to the new weight w'. In particular, note that if the effect of w' is not to produce new coset leaders, but only to modify their order, then a bounded distance decoder may still be different for w' than for w.

The present invention is also illustrated for non-binary codes using a simple example. Consider an extended Reed-Solomon code with parameters (4,2;3) over the quaternary finite field, q=4. The generator matrix is given by $$G = \begin{bmatrix} 1032 \\ 0123 \end{bmatrix}$$

For reference, the addition and multiplication tables for the quaternary field are shown in Table 3.

TABLE 3

| + | 0 | 1 | 2 | 3 |   | * | 0 | 1 | 2 | 3 |
|---|---|---|---|---|---|---|---|---|---|---|
| 0 | 0 | 1 | 2 | 3 |   | 0 | 0 | 0 | 0 | 0 |
| 1 | 1 | 0 | 3 | 2 |   | 1 | 0 | 1 | 2 | 3 |
| 2 | 2 | 3 | 0 | 1 |   | 2 | 0 | 2 | 3 | 1 |
| 3 | 3 | 2 | 1 | 0 |   | 3 | 0 | 3 | 1 | 2 |

The codewords can be computed as y=x G using Table 3, where x is a k-tuple over the quaternary field. They are shown in Table 4, along with their Hamming weights w(y).

TABLE 4

| codeword y | weight w(y) |
|---|---|
| 0000 | 0 |
| 0123 | 3 |
| 0231 | 3 |
| 0312 | 3 |
| 1032 | 3 |
| 1111 | 4 |
| 1203 | 3 |
| 1320 | 3 |
| 2013 | 3 |
| 2130 | 3 |
| 2222 | 4 |
| 2301 | 3 |
| 3021 | 3 |
| 3102 | 3 |
| 3210 | 3 |
| 3333 | 4 |

A parity check matrix corresponding to G is given by:

$$H = \begin{bmatrix} 3210 \\ 2301 \end{bmatrix}$$

The syndromes, the coset leaders, and the coset leader weights are given in Table 5.

TABLE 5

| syndrome s | coset leader e | weight w(e) |
|---|---|---|
| 00 | 0000 | 0 |
| 01 | 0001 | 1 |
| 02 | 0002 | 1 |
| 03 | 0003 | 1 |
| 10 | 0010 | 1 |
| 12 | 0300 | 1 |
| 13 | 2000 | 1 |
| 20 | 0020 | 1 |
| 21 | 3000 | 1 |
| 23 | 0100 | 1 |
| 30 | 0030 | 1 |
| 31 | 0200 | 1 |
| 32 | 1000 | 1 |
| 11 | 1100 | 2 |
| 22 | 2200 | 2 |
| 33 | 3300 | 2 |

As in the previous example, the soft information $r_i$ is assumed to be available for each received character $z_i$. Suppose $r_1=r_2=1$, and $r_3=r_4=2$. This means that the last 2 characters are more reliable than the first 2. We now choose a new coset leader e' according to the new weight w'. There are a number of "ties" between coset leader candidates, which are broken arbitrarily. The syndromes and the new coset leaders are given in Table 6. Note there are 4 new coset leaders. In a manner similar to the previous example, the coset leaders have shifted their non-zero characters towards the left. Again, this means that the error correcting capability of the code is being focused on the unreliable section of the received word.

TABLE 6

| syndrome s | coset leader e' | weight w(e') | weight w'(e') |
|---|---|---|---|
| 00 | 0000 | 0 | 0 |
| 01 | 2300 | 2 | 2 |
| 02 | 3100 | 2 | 2 |

TABLE 6-continued

| syndrome s | coset leader e' | weight w(e') | weight w'(e') |
|---|---|---|---|
| 03 | 0003 | 1 | 2 |
| 10 | 3200 | 2 | 2 |
| 12 | 0300 | 1 | 1 |
| 13 | 2000 | 1 | 1 |
| 20 | 1300 | 2 | 2 |
| 21 | 3000 | 1 | 1 |
| 23 | 0100 | 1 | 1 |
| 30 | 0030 | 1 | 2 |
| 31 | 0200 | 1 | 1 |
| 32 | 1000 | 1 | 1 |
| 11 | 1100 | 2 | 2 |
| 22 | 2200 | 2 | 2 |
| 33 | 3300 | 2 | 2 |

This is particularly attractive if the reliability values are not for characters, but for blocks of characters. This can be the case when the codeword is interleaved over several slots in a slotted system in order to increase diversity against fading. Then a simple form of reliability is to assign the same soft value to all the characters transmitted over the same slot. For example, suppose a codeword is interleaved over 2 slots, and 2 reliability values are used, say 1 and 2. Then we need to store 3 sets of coset leaders, for cases (I,I), (1,2), and (2,1). (Case (2,2) would be the same as (1,1) in our context.)

Storage can also be reduced if symmetry is exploited. Consider the Reed-Solomon example again, and suppose we wish to use a bounded distance decoder with L=13, i.e. the last 3 rows in Table 5 are removed. Then one can see that the coset leaders are the all-zero n-tuple and every n-tuple with one non-zero character. Thus we need only store a reduced number of pre-computed coset leader lists. For instance, in the above example, the (2,1) case can be derived from the (1,2) case by swapping the first and second halves of the coset leaders in the (1,2) case.

In general, the most straightforward way to choose L such that the coset leaders exhibit perfect symmetry is the following. Suppose the coset leaders are ordered by increasing Hamming weight. A "radius" $\rho$ is picked such that $2\rho+1 \leq d$. We then choose L such all coset leaders of Hamming weight $\leq \rho$ are kept, and all other coset leaders are removed. Then the coset leaders are perfectly symmetric in that a permutation of a coset leader is another coset leader. For the Reed-Solomon example, d=3, and choosing $\rho=1$ yields L=13, as before.

It is to be understood that the above-described embodiment is merely an illustrative principle of the invention and that those skilled in the art may devise many variations without departing from the scope of the invention. My invention applies to linear codes over finite fields. It can also be specialized to those with special structures that admit more efficient decoders, such as cyclic codes, BCH codes, and Reed-Solomon codes. My invention can be extended to certain classes of nonlinear codes with regular structure that behave essentially like linear codes, such as Kerdock codes. The invention also extends to syndrome based algebraic decoders for convolutional codes. It is, therefore, intended that such variations be included within the scope of the following claims.

What is claimed is:

1. A method for use in a data decoder for deriving a codeword estimate from an actual received word, said codeword estimate comprising restored encoded data, said actual received word comprising one of a predetermined set of possible received words, said actual received word comprising a plurality of characters, each of said characters having a reliability value, said method comprising the steps of:

accepting an actual received word;

computing a syndrome for said actual received word;

computing a syndrome for each member of the predetermined set of possible received words;

classifying each member of the predetermined set of possible received words into a plurality of cosets according to each member's syndrome;

determining a weight for each member of the predetermined value of possible received words, said weight comprising a function of said reliability values;

selecting a coset leader from each of said cosets, said coset leader having a predefined weight;

summing said plurality of reliability values and selecting a coset leader table corresponding to said sum from a plurality of coset leader tables;

selecting a coset leader with the same syndrome as said received word syndrome; and subtracting said selected coset leader from said received word to derive said codeword estimate.

2. A method in accordance with claim 1 wherein said step of computing a syndrome for said actual received word comprises manipulating said received word with a decoding matrix.

3. A method in accordance with claim 1 wherein said predefined weight is the lowest of said determined weights.

4. A method in accordance with claim 1 wherein said predefined weight comprises the fewest number of non-zero characters in said received word.

5. A method in accordance with claim 1 wherein said predefined weight comprises the fewest number of non-zero characters with low reliability scores.

6. A linear decoder that is capable of using hard information comprising definite data and soft information comprising indefinite information, said method comprising:

a memory storing a table including a plurality of syndromes and an equal plurality of coset leaders, each of said plurality of syndromes being paired with one of said plurality of coset leaders;

means for computing a syndrome in response to accepting a received word;

means for using said soft information to select one of said plurality of coset leader tables; and means for determining an estimate of said codeword using said received code word and said selected coset leader.

7. A linear decoder in accordance with claim 6 wherein said means for determining an estimate of said codeword comprises means for selecting a coset leader responsive to said syndrome.

8. A linear decoder in accordance with claim 6 wherein said means for determining an estimate comprises means for subtracting said coset leader from said received word.

9. A method for deriving a codeword estimate from a codeword comprising a plurality of characters, each of said characters having been assigned a reliability value, said method comprising:

determining whether said received word is in error; and deriving a codeword estimate by correcting one or more of said characters with low reliability values, comprising determining a limited set of possible received words, determining a syndrome for each member of said set, classifying each member of said set into a coset based on its syndrome, weighting each member of said received word based on said characters with low reliability, selecting a coset leader for each coset based on a predetermined weight, determining a syndrome for said received word, and subtracting said coset leader with the same syndrome as said received word from said received word.

10. A method in accordance with claim 9 wherein said step of determining whether said received word is in error comprises computing a syndrome for said received word, wherein one or more of the resulting syndromes indicate an error.

11. A method in accordance with claim 10 wherein said codeword is encoded by manipulating said codeword with an encoding matrix, and wherein computing a syndrome for said codeword comprises manipulating said codeword with a decoding matrix.

12. A method in accordance with claim 11 wherein manipulating said encoding matrix and said decoding matrix yields zero, and wherein an error is detected when said syndrome of said received word is non-zero.

13. A method for developing a table of coset leaders corresponding to a syndrome for use in a decoder that derives a codeword estimate from a received word by subtracting a selected one of said coset leaders according to its syndrome, said codeword comprising a plurality of characters, each of said characters having a reliability value, said method comprising the steps of:

(a) determining all members of the set of possible received words;

(b) determining a syndrome for each member of said set;

(c) classifying each member of said set into a coset based on its syndrome;

(d) weighting each member of said set based on one or more of said characters having low reliability values;

(e) selecting a coset leader from each coset having a predetermined weight;

(f) repeating steps (d) and (e) for each member of said set's reliability values; and (g) storing said table in a memory device.

14. A method for use in a data decoder for deriving a codeword estimate from a received word, said codeword estimate comprising restored encoded data, said received word comprising one of a predetermined set of received words, said received word comprising a plurality of characters, each of said characters having a reliability value, said data decoder including a memory wherein each member of said predetermined set of received words is classified into one of a plurality of cosets according to the word's syndrome, said method comprising the steps of:

accepting a received word and a reliability value for each of said plurality of characters in said received word;

computing a syndrome for said received word;

selecting one of said plurality of cosets corresponding to said computed syndrome of said received word;

selecting a coset leader from each of said cosets according to said reliability values for each of said plurality of characters in said received word; and subtracting said selected coset leader from said received word to derive said codeword estimate.

* * * * *